United States Patent
Doerner et al.

(10) Patent No.: US 8,775,800 B2
(45) Date of Patent: Jul. 8, 2014

(54) EVENT-DRIVEN PROVISION OF PROTECTED FILES

(75) Inventors: Robert Doerner, Offenbach (DE); Achim Enenkiel, Karisruhe (DE)

(73) Assignee: SAP AG, Walldorf (DE)

(*) Notice: Subject to any disclaimer, the term of this patent is extended or adjusted under 35 U.S.C. 154(b) by 670 days.

(21) Appl. No.: 12/938,008

(22) Filed: Nov. 2, 2010

(65) Prior Publication Data
US 2012/0110327 A1    May 3, 2012

(51) Int. Cl.
H04L 29/06    (2006.01)

(52) U.S. Cl.
USPC ........................................................ 713/165

(58) Field of Classification Search
USPC ........................................................ 713/165
See application file for complete search history.

(56) References Cited

U.S. PATENT DOCUMENTS

| | | | |
|---|---|---|---|
| 6,226,618 B1 * | 5/2001 | Downs et al. | 705/51 |
| 6,760,752 B1 * | 7/2004 | Liu et al. | 709/206 |
| 8,085,937 B1 * | 12/2011 | Bradley, II | 380/282 |
| 2003/0065941 A1 * | 4/2003 | Ballard et al. | 713/201 |
| 2009/0161869 A1 * | 6/2009 | Chow et al. | 380/259 |
| 2011/0110525 A1 * | 5/2011 | Gentry | 380/285 |

OTHER PUBLICATIONS

Axantum Software AB / AxCrypt / Introduction, retrieved Nov. 2, 2010, Axantum, download from http://www.axantum.com/AxCrypt/Introduction.html, 3pgs.
"About MyDrive", retrieved Nov. 2, 2010, MyDrive, download from http://www.mydrive.ch/about, 2pgs.
"TrueCrypt: Free Open-source disk encryption software for Windows 7/Vista/XP, Mac OS X, and Linux", retrieved Nov. 2, 2010, download from http://www.truecrypt.org, 1pg.
"Technology", Wuala by Lacie, retrieved Nov. 2, 2010, download from http://www.wuala.com/en/learn/technology, 2pgs.

* cited by examiner

*Primary Examiner* — Teshome Hailu
(74) *Attorney, Agent, or Firm* — Buckley, Maschoff & Talwalkar LLC

(57) ABSTRACT

A system may include reception of a request for an encryption key pair including a first private encryption key and a first public encryption key, the encryption key pair associated with a future event, generation of the encryption key pair, transmission of the first public encryption key to a second device, reception, from the second device, of a file encrypted using the first public encryption key and using a second public encryption key of an intended recipient, transmission of the file to a third device associated with the intended recipient, detection of the future event, and, in response to the detection of the future event, transmission of the first private encryption key to the third device.

17 Claims, 8 Drawing Sheets

EVENT-DRIVEN PROVISION OF PROTECTED FILES

BACKGROUND

Modern computing networks facilitate the transmission of information from one party to another. If the information is confidential or otherwise sensitive, one or more systems may be employed to prevent unauthorized parties from accessing the information. These systems generally include securing the communication channel and/or securing the information itself.

For example, the information may be transmitted over a channel such as a Virtual Private Network (VPN) or an internal network which is segregated from external networks. Alternatively, the World Wide Web also provides a "secure" protocol (HTTPS) for transmitting information between a Web server and a Web browser. Each of the available communication channels may provide various degrees of security. Since most information passes at least partially through an unsecured network (e.g., the Internet), it is often preferable to assume that the communication channel is insecure and to instead secure the information itself.

Information may be secured using password-protection (e.g., in its native file format or within a password-protected .zip file) or encryption prior to transmission. Passwords or other data needed to access/decrypt the information are provided only to the intended recipients of the information. Due to the relatively low level of protection provided by passwords, and because the passwords themselves are typically transmitted over insecure channels, public key encryption is often preferred.

According to public key encryption principles, data encrypted using a public encryption key may only be decrypted using a private encryption key that corresponds to the public encryption key. A public encryption key and its corresponding private encryption key are referred to as an encryption key pair. A user's public encryption key is typically made freely available, while the user privately maintains his/her private encryption key.

In one example, user A obtains user B's public encryption key and encrypts a file (e.g., a Word document) using user B's public encryption key. The encrypted file is transmitted using any communication channel(s) to user B, and is decrypted by user B using user B's private encryption key. The security of the communication channel(s) is relatively immaterial, because only user B is able to decrypt the encrypted message (i.e., only user B possesses the appropriate private encryption key).

In the above example, user B is able to decrypt the file immediately upon receipt. However, in some instances, it may be desirable to provide the encrypted file to user B but to prevent user B (or anyone else) from decrypting the file until a certain time (e.g., after the occurrence of a specified event). It may also be desirable to allow user B to confirm that the file was transmitted by user A, while still preventing user B (and anyone else) from decrypting the file until the certain time.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
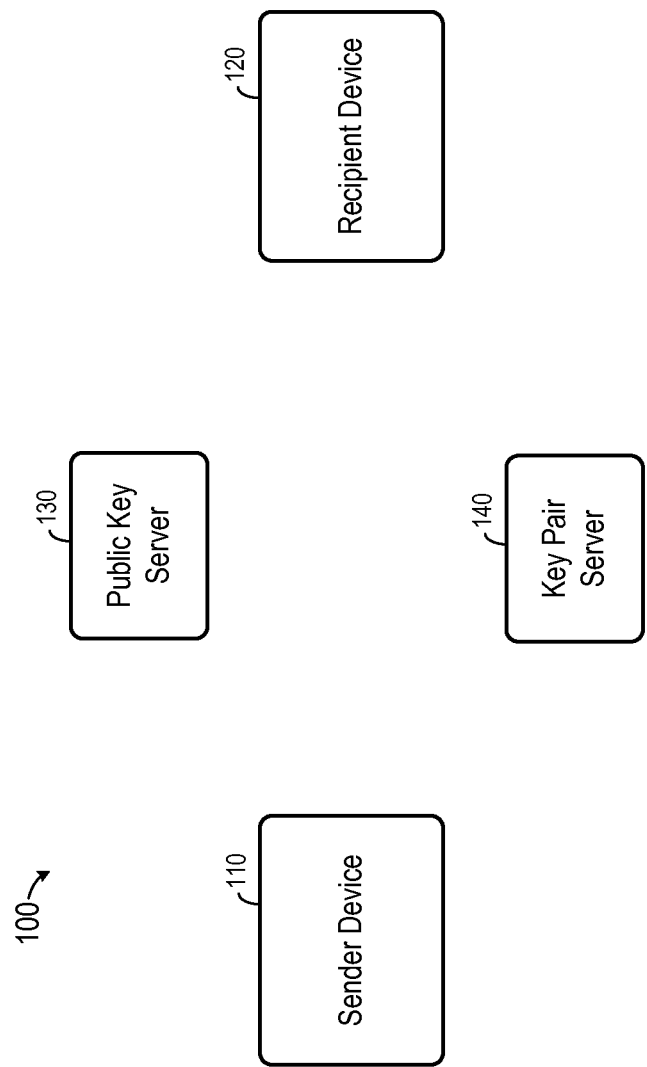
FIG. 1 is a block diagram of a system according to some embodiments.

FIG. 1 is a functional block diagram of system 100 according to some embodiments. Embodiments are not limited to system 100 and/or to the following description thereof. Each element of system 100 may be implemented by any suitable combination of hardware (e.g., one or more processors) and/or software (e.g., processor-executable program code). System 100 may include elements in addition to those illustrated, and some embodiments may omit one or more elements of system 100.

System 100 includes sender device 110 and recipient device 120. In the examples below, sender device 110 transmits a file that is to be received by recipient device 120. Sender device 110 may generate the file (e.g., by executing a word processing application to create and save a word processing file) or may receive the file from another source (not shown).

Sender device 110 may encrypt the file as described below by executing an application that was used to generate the file or a separate application. Similarly, sender device 110 may transmit the encrypted file using the application that was used to generate the file, application that was used to encrypt the file, or a separate application. According to one example, sender device 110 may use a presentation application to generate a file, and then use a mail client application to attach the file to an electronic mail message, to encrypt the file, and to transmit the encrypted electronic mail message. In another example, sender device 110 may use a presentation application to generate a file, and then use a Web browser application to encrypt and transmit the file.

Recipient device 120 may receive an encrypted file and decrypt the file as according to some embodiments. In one example, recipient device 120 executes a Web browser application to receive and decrypt the file. In another non-exhaustive example, the encrypted file is received and decrypted by a mail client application of recipient device 120. As will be described in detail below, recipient device 120 may decrypt the file using a private encryption key of an intended recipient and using a private encryption key associated with an event.

Public key server 130 may comprise any system to provide public encryption keys to requestors. As described in the Background, each public encryption key is associated with a user, who privately maintains a corresponding private key. Therefore, by receiving a public key of a user from public key server 130, a sender (e.g., sender device 120) may generate encrypted files that may be only decrypted by the user.

Key pair server 140 may comprise any system to generate an encryption key pair. Key pair server 140 may be mutually trusted by a user of sender device 110 and a user of recipient device 120. As will be described below, key pair server 140 may generate an encryption key pair that is associated with a future event, provide sender device 110 with a public encryption key of the encryption key pair, and provide the private encryption key of the encryption key pair to recipient device 120 upon detection of the event.

The block diagrams herein represent logical architectures for describing processes according to some embodiments, and actual implementations may include more or different components arranged in other manners. Moreover, each system described herein may be implemented by any number of devices in communication via any number of other public and/or private networks. Two or more devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

Figure 2:
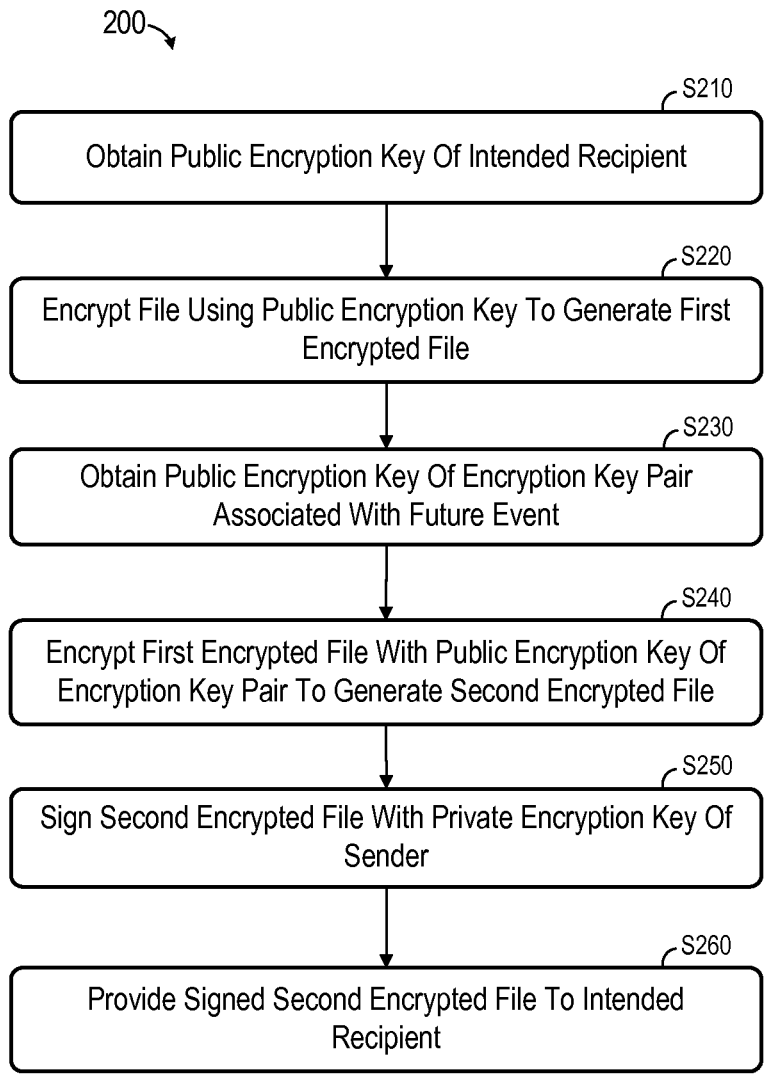
FIG. 2 is a flow diagram of a process according to some embodiments.

FIG. 2 is a flow diagram of process 200 according to some embodiments. Process 200 may be executed by hardware and/or embodied in program code stored on a non-transitory computer-readable medium. Process 200 may be performed by sender device 110 of system 100, but embodiments are not limited thereto.

The processes described herein may provide access to data upon occurrence of a specified event. The data is secured until occurrence of the event, and, in some embodiments, an intended recipient of the data may verify the origin of the secured prior to occurrence of the event.

Some embodiments may be used to facilitate any scenario in which full access to information is to be withheld until conditions are met. Tasks which may benefit from some embodiments include selling of intellectual property (e.g., music, film, books), provision of scheduled payments, submission of a sealed bid to be opened at completion of an auction, release of a will after death, and provision of proprietary or confidential information subject to conditions.

Initially, at S210, a public encryption key of an intended recipient is obtained. The public encryption key may be obtained directly from the intended recipient (e.g., as an electronic mail attachment), from a public key server, or from any other source.

Figure 3:
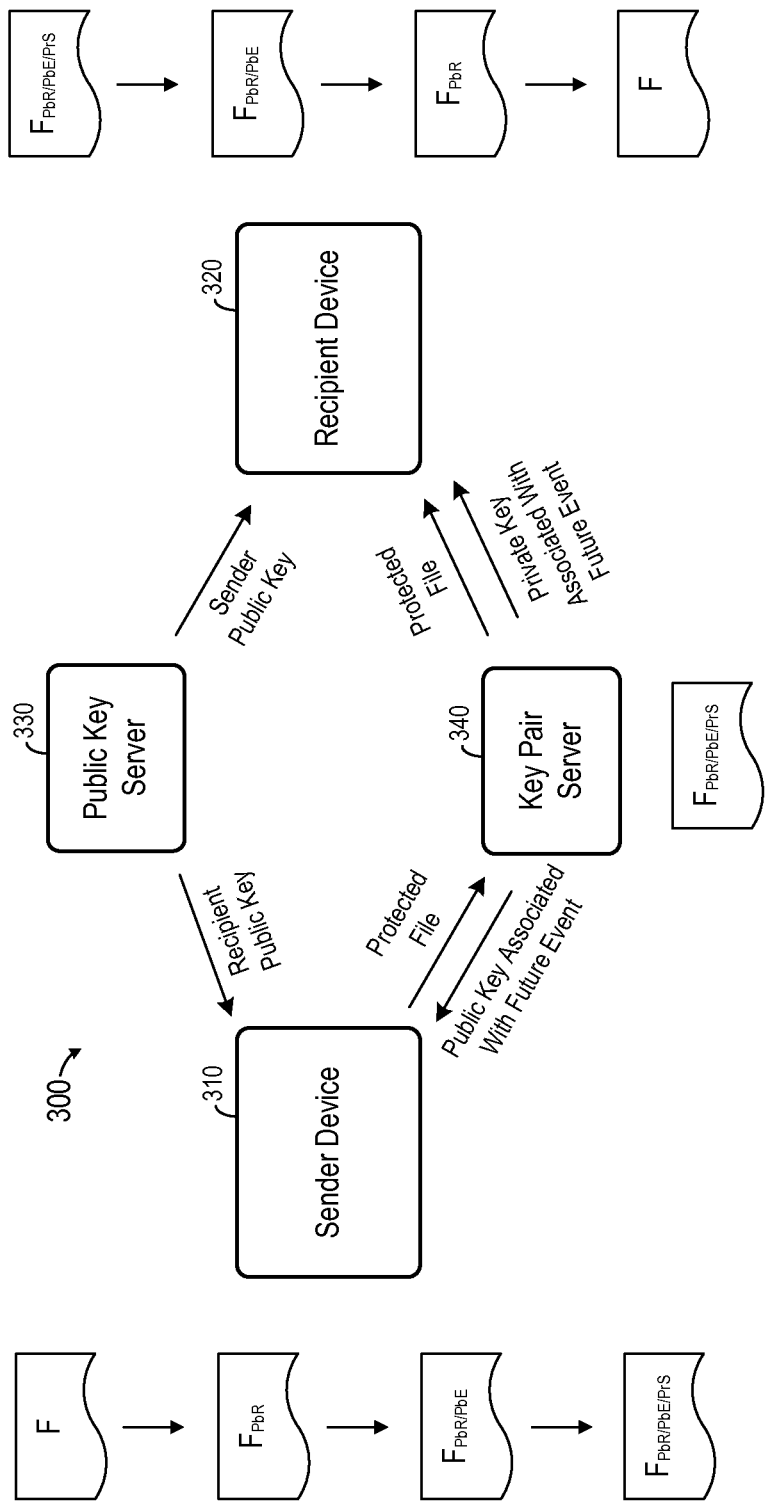
FIG. 3 is a block diagram of a system illustrating operation according to some embodiments.
Figure 4:
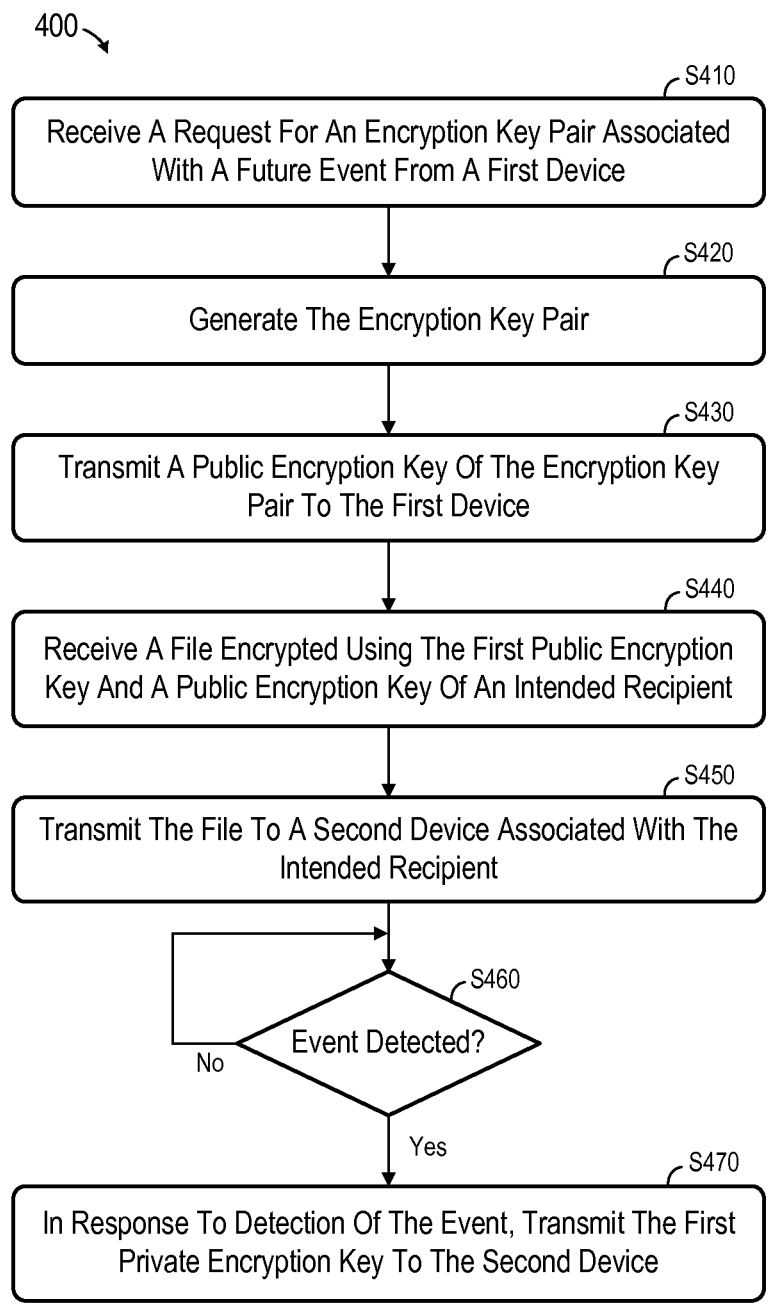
FIG. 4 is a flow diagram of a process according to some embodiments.

FIG. 3 illustrates system 300 according to some embodiments. The elements of system 300 may be implemented as described above with respect to similarly-named elements of system 100. FIG. 3 illustrates one particular implementation of process 200, but implementations of process 200 are not limited thereto.

In this regard, FIG. 3 shows sender device 310 receiving a public encryption key of a recipient from public key server 330 at S210. Sender device 310 may, for example, execute an application providing encryption functions, and this application may request a public encryption key of an intended recipient from public key server 330 prior to S210. According to the present example, the intended recipient is a user of recipient device 320.

Next, at S220, a file is encrypted using the public encryption key to generate a first encrypted file. The file may comprise any type of file in any format that is or becomes known. Non-exhaustive examples include: a word processing file, an electronic mail file, a presentation file, a spreadsheet file, and a multimedia file. The file may have been generated by sender device 310 or received by sender device 310 from another device. File F on the left side of FIG. 3 represents the file prior to S220, and file $F_{PbR}$ represents the file after encryption using the public encryption key (Pb) of the recipient (R).

Sender device 310 may execute any suitable application to provide the encryption at S220, including an application that performs one or more other functions attributed herein to sender device 310 (e.g., file creation, file transmission, etc.). The file may be encrypted at S220 using any encryption algorithm based on encryption key pairs. Pretty Good Privacy (PGP) is an example of one such algorithm, but embodiments may employ any currently- or hereafter-known encryption algorithm.

At S230, a public encryption key of an encryption key pair is obtained. The encryption key pair is associated with a future event. According to some embodiments, and as illustrated in FIG. 3, the public encryption key is obtained from key pair server 340 at S230. In a particular example, sender device 310 may execute a Web browser to access Web pages maintained by key pair server 340. Sender device 310 may manipulate the Web pages to request an encryption key pair and to specify a future event. Sender device 310 may also specify one or more intended recipients. In response, key pair server 340 generates the encryption key pair, associates the encryption key pair with the future event and the one or more intended recipients, and provides the public encryption key to sender device 310. As described above, the private encryption key of the encryption key pair is to be provided to the one or more intended recipients upon detection of the future event.

At S240, the already-encrypted file is encrypted using the public encryption key received at S230. This twice-encrypted file will be referred to as the "second" encrypted file, and is represented by file $Fp_{PbR/PbE}$ represents the file after encryption using the public encryption key (Pb) associated with the event (E).

The second encrypted file is signed with the private encryption key of the sender at S250. For example, a user operating sender device 310 may be associated with an encryption key pair, and a private encryption key of the key pair is used at S250 to digitally sign the second encrypted file. File $F_{PbR/PbE/PkS}$ pictured next to sender device 310 represents the second encrypted file after signing with the private encryption key (Pr) of the sender (S).

Any algorithm for signing a file using a private encryption key may be employed at S250. The algorithm preferably allows for verification of the digital signature using a public encryption key corresponding to the private key used to sign the file. In the present example, the public encryption key of the key pair associated with the sender may be used to verify that the digitally-signed file was indeed signed by the sender (i.e., using the sender's private encryption key).

The signed file is provided to the intended recipient at S260. Any system for providing a file may be employed at S260. According to FIG. 3, sender device 310 transmits the file to key pair server 340. Key pair server 340 may then provide the file to recipient device 320 based on any trigger, such as detection of one or more events. Such an event may include receipt of a request for the file from recipient device 320, passage of a specified period of time, reaching of a designated time, and the future event with which the encryption key pair received at S230 is associated. In the latter case, the file and the private encryption key of the encryption key pair may be transmitted to recipient device 320 substantially simultaneously.

Process 400 further describes the operation illustrated by FIG. 3, from the point of view of key pair server 340. As previously described with respect to S230, key pair server 340 may, at S410, receive a request for an encryption key pair from sender device 310. The request specifies a future event and may also specify one or more intended recipients. In response, key pair server 340 generates the encryption key pair at S420, and transmits the public encryption key to sender device 310 at S430.

A file encrypted using the public encryption key is received at S440. The file is also encrypted using a public encryption key of an intended recipient, and may further be digitally signed using a private encryption key of the sender. Such a file is represented by file $F_{PbR/PbE/PkS}$ depicted below key pair server 340 in FIG. 3. As will be described below, embodiments are not limited to receipt of the file by key pair server 340.

At S450, the received file is transmitted to a device associated with the intended recipient. As described above, key pair server 340 may provide the file to recipient device 320 based on any suitable trigger.

Flow pauses at S460 until the event associated with the generated encryption key pair is detected. Accordingly, process 400 may pause for any amount of time prior to proceeding to S470. The detection may comprise one or more of, for example, detection of a change in legal status, detection of a deposit of a particular amount of money into a particular account, detection of the passage of a specified period of time, detection of reaching a designated time, detection of a particular input code sequence, detection of a death, and detection of any other event by any suitable means.

In response to detection of the event, the private encryption key of the encryption key pair is to be provided to the second device at S470.

Figure 5:
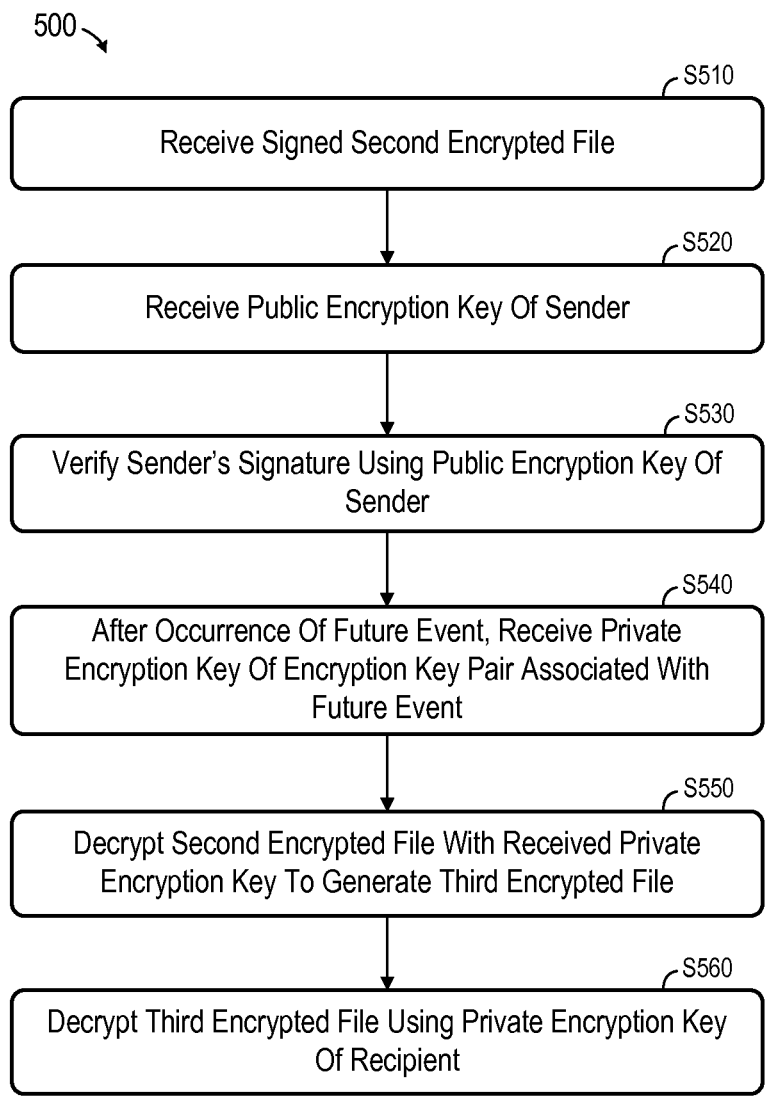
FIG. 5 is a flow diagram of a process according to some embodiments.

Process 500 of FIG. 5 will now be described, from the point of view of recipient device 320, to complete the description of FIG. 3. Initially, at S510, the signed second encrypted file is received. In the FIG. 3 example, the signed second encrypted file is received from key pair server 340, and is denoted on the right side of FIG. 3 as file $F_{PbR/PbE/PkS}$.

In one example, key pair server 340 provides a hyperlink to sender device 310 along with the public key associated with the event at S430, or after receiving the file from sender device at S440. The hyperlink points to the file as stored on a Web server of key pair server 340. Sender device 310 may provide the hyperlink to recipient device 320 at S260. Therefore, at S510, recipient device 320 may execute a Web browser application to select the hyperlink and receive the file from key pair server 340.

Recipient device 320 receives the sender's public encryption key at S520. Recipient device 320 may request the sender's public encryption key from public key server 330 as described above with respect to the recipient's public encryption key.

The sender's public encryption key and the private encryption key used at S250 belong to the same encryption key pair. Accordingly, the sender's public encryption key is used at S530 to verify the sender's signature. The result of the verification is file $F_{PbR/PbE}$, shown adjacent to recipient device 320.

As described above, key pair server 340 transmits a private encryption key to recipient device at S470 after detecting a future event associated with the private encryption key. This private encryption key is received by recipient device 320 at S540, and is used to decrypt file $F_{PbR/PbE}$ at S550. The resulting file $F_{PbR}$ is then decrypted using the private encryption key of the intended recipient at S560.

By virtue of embodiments of the foregoing, a file may be transmitted to an intended recipient to allow the recipient to confirm that the file was transmitted by a particular sender, while denying access to the contents of the file until after the occurrence of a specified event. Moreover, such access is controlled by a third-party, rather than by the sender.

Figure 6:
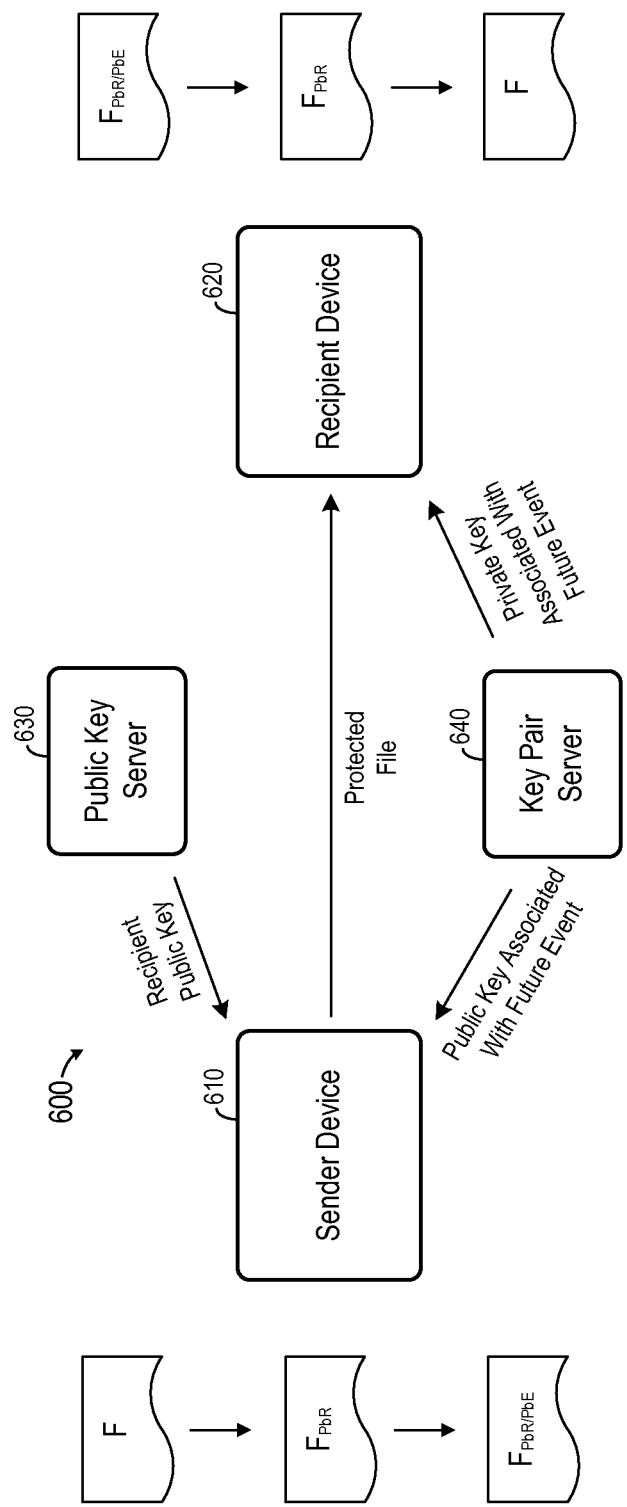
FIG. 6 is a block diagram of a system illustrating operation according to some embodiments.

FIG. 6 illustrates system 600 according to some embodiments. The elements of system 600 may be implemented as described above with respect to similarly-named elements of systems 100 and/or 300. FIG. 6 illustrates variations of the operation depicted in FIG. 3.

FIG. 6 illustrates two primary variations from the FIG. 3 operation. First, sender device 610 does not sign the encrypted file. With reference to process 200, FIG. 6 represents omission of S250. Since the file is not signed, recipient device need not receive the public encryption key of the sender or verify the sender's signature as described with respect to S520 and S530.

Second, the file $F_{PbR/PbE}$ is provided directly to recipient device 620 from sender device 610 at S470. In still other embodiments, the file may be provided to an unshown intermediary, from where it is provided to recipient device 620 upon request and/or in response to any other desired trigger.

Figure 7:
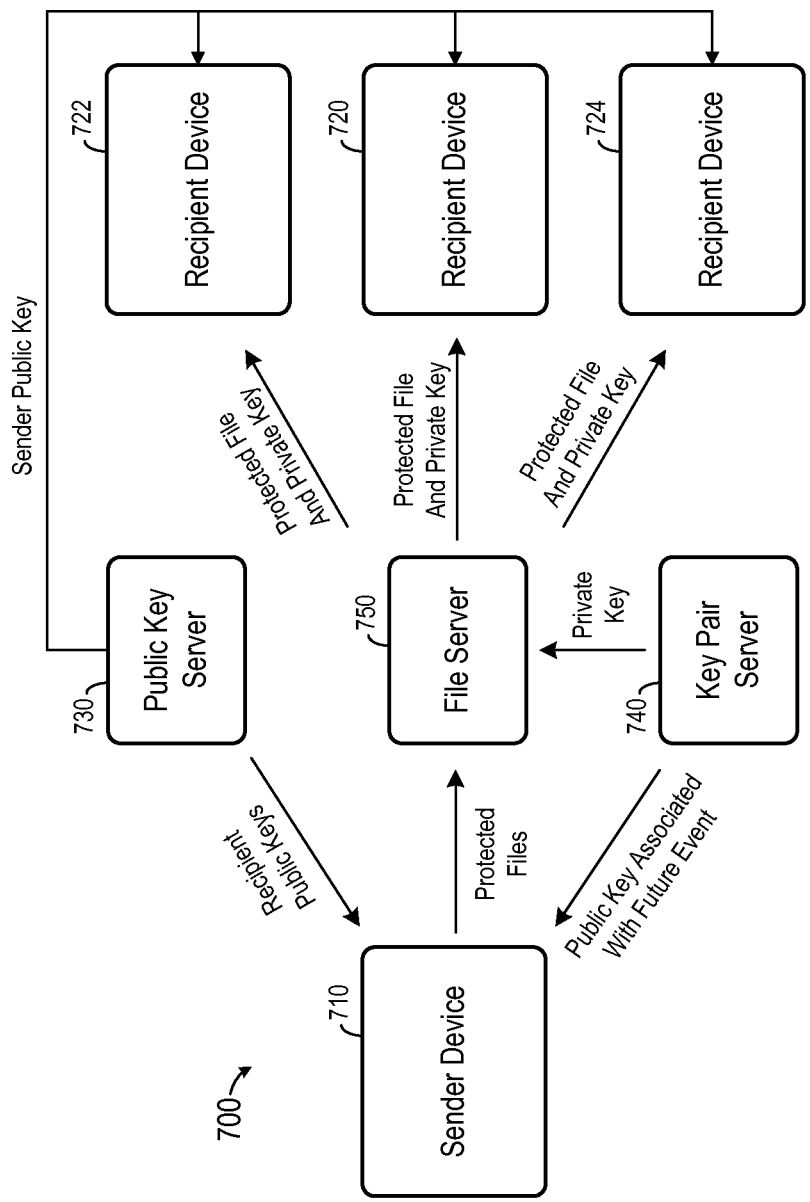
FIG. 7 is a block diagram of a system illustrating operation according to some embodiments.

FIG. 7 illustrates yet another implementation according to some embodiments. According to FIG. 7, sender device 710 receives a public encryption key associated with each user of recipient devices 720, 722 and 724. Therefore, at S220, sender device 710 generates three different encrypted files, with each file being encrypted using a different public encryption key corresponding to one of the three intended recipients. Then, at S240, each of the three encrypted files is encrypted using the public encryption key received from key pair server 740.

In some embodiments, sender device 710 generates a single encrypted file based on the three public encryption keys, and the single encrypted file is transmitted to each of recipient devices 720, 722 and 724 using any system as described herein. For example, some encryption systems (e.g., PGP) initially encrypt a file via a fast symmetric-key algorithm. Next, the used symmetric key (i.e., the session key) is encrypted via a slower asymmetric-key algorithm using the three public encryption keys of the intended recipients. The resulting three encryptions of the session key are appended to the symmetrically-encrypted file to create the single encrypted file. Consequently, any of recipient devices 720, 722 and 724 may decrypt the single encrypted file using a private encryption key corresponding to one of the three public encryption keys.

FIG. 7 also introduces file server 750, which may comprise any software and/or hardware system to receive the three encrypted files from sender device 710 at S260 and to receive the private encryption key from key pair server 740. In this regard, file server 750 may provide the twice-encrypted files to the appropriate ones of recipient devices 720, 722 and 724 as described above. Moreover, file server 750 may perform the detection of the event and the transmission of the private key to each of recipient devices at S460 and S470. Embodiments may include any suitable combinations of the various alternatives described herein.

Figure 8:
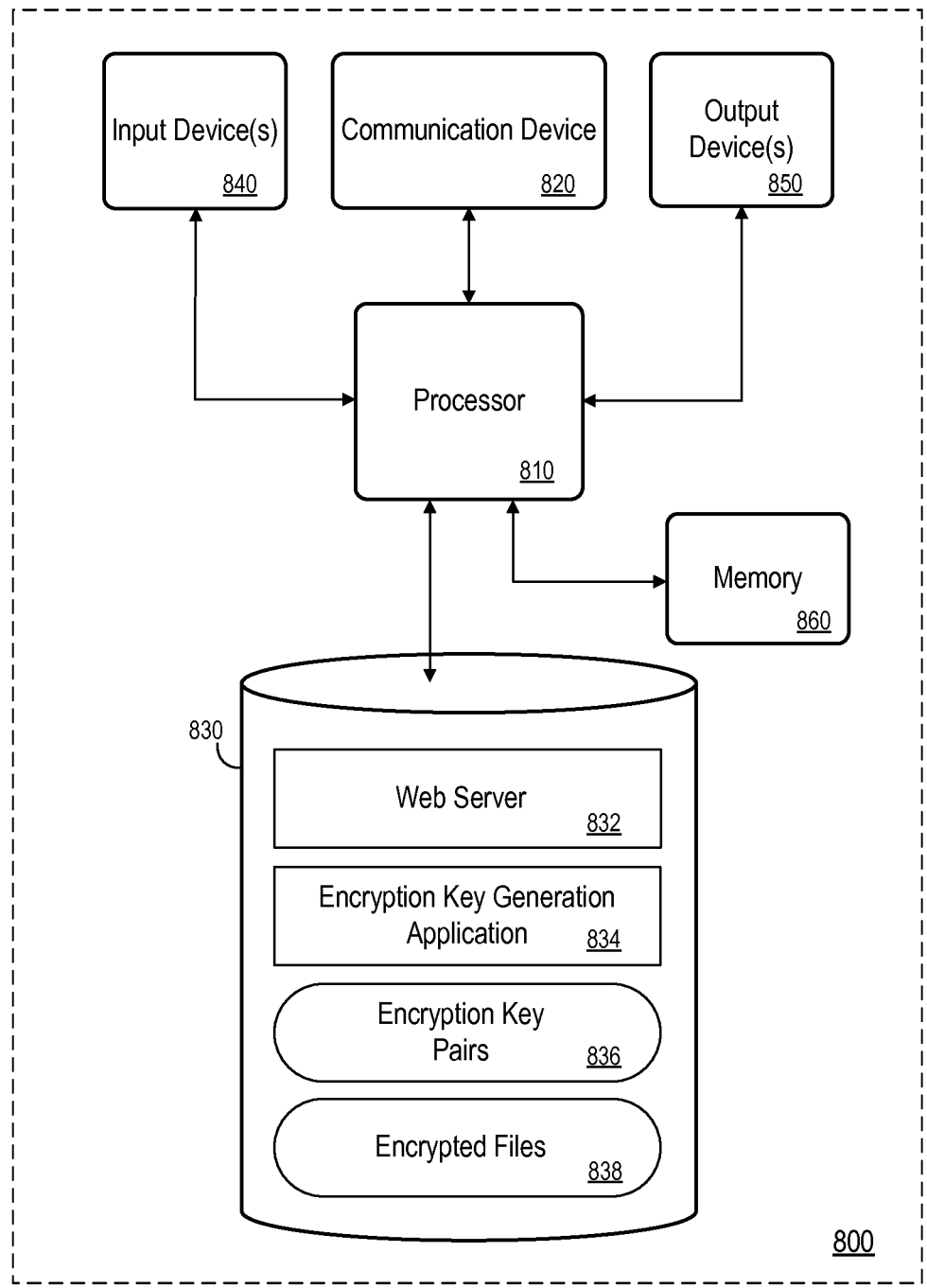
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of key pair server 140 to execute process 400. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with an external network such as the Internet. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise RAM.

Program code of Web server 832 and encryption key generation application 834 may be executed by processor 810 to cause apparatus 800 to perform any one or more of the processes described herein. For example, code of Web server 832 may be executed to provide Web pages to a device, through which the device may request an encryption key pair associated with a future event. Program code of encryption key generation application 834 may then be executed to generate the requested key pair, which is stored among encryption key pairs 836.

Encrypted files received from a sender device may be stored in encrypted files 838. As described above, code of Web server 832 may be executed to provide one of encrypted files 838 to a recipient device. Embodiments are not limited to execution of these processes by a single apparatus. Data storage device 830 may also store data and other program code for providing additional functionality and/or which are necessary for operation thereof, such as device drivers, operating system files, etc.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a first device comprising:
        a first memory system storing first processor-executable instructions; and
        a first processor to execute the first processor-executable instructions in order to cause the first device to:
            encrypt a file using a first public encryption key of an intended recipient to generate a first encrypted file;
            acquire a second public encryption key of an encryption key pair associated with an occurrence of a future event that is independent of the encryption key pair and an intended recipient, wherein a private encryption key of the encryption key pair associated with an occurrence of a future event is to be provided to the intended recipient in response to detection of the occurrence of the future event; and
            encrypt the first encrypted file using the second public encryption key associated with an occurrence of a future event to generate a second encrypted file.

2. The system according to claim 1, the first processor to further execute the first processor-executable instructions in order to cause the first device to:
    sign the second encrypted file using a private encryption key of a sender.

3. The system according to claim 1, further comprising:
    a second device comprising:
        a second memory system storing second processor-executable instructions; and
        a second processor to execute the second processor-executable instructions in order to cause the second device to:
            generate the encryption key pair associated with an occurrence of a future event;
            transmit the second public encryption key to the first device;
            detect the occurrence of the future event; and
            transmit the private encryption key of the encryption key pair associated with an occurrence of a future event to the intended recipient in response to the detection of the occurrence of the future event.

4. The system according to claim 1, further comprising:
    a second device comprising:
        a second memory system storing second processor-executable instructions; and
        a second processor to execute the second processor-executable instructions in order to cause the second device to:
            receive the second encrypted file;
            receive the private encryption key of the encryption key pair associated with an occurrence of a future event in response to detection of the occurrence of the future event;
            decrypt the second encrypted file using the private encryption key associated with an occurrence of a future event to generate a third encrypted file; and
            decrypt the third encrypted file using a second private encryption key associated with the first public encryption key of the intended recipient.

5. The system according to claim 4, further comprising a third device comprising:
    a third memory system storing second processor-executable instructions; and
    a third processor to execute the third processor-executable instructions in order to cause the third device to:
        generate the encryption key pair;
        transmit the second public encryption key to the first device;
        detect the occurrence of the future event; and
        transmit the private encryption key of the encryption key pair to the second device in response to the detection of the occurrence of the future event.

6. The system according to claim 4, the first processor to further execute the first processor-executable instructions in order to cause the first device to:
    sign the second encrypted file using a private encryption key of a sender, and
    the second processor to further execute the second processor-executable instructions in order to cause the second device to:
        verify the signed sign second encrypted file using a third public encryption key associated with the private encryption key of the sender.

7. The system according to claim 6, further comprising:
    a second device comprising:
        a second memory system storing second processor-executable instructions; and
        a second processor to execute the second processor-executable instructions in order to cause the second device to:
            receive the second encrypted file;

receive the private encryption key of the encryption key pair associated with an occurrence of a future event in response to detection of the occurrence of the future event;

decrypt the second encrypted file using the private encryption key associated with an occurrence of a future event to generate a fifth encrypted file; and decrypt the fifth encrypted file using a second private encryption key associated with the first public encryption key of the intended recipient;

and further comprising:

a third device comprising:
a third memory system storing third processor-executable instructions; and
a third processor to execute the third processor-executable instructions in order to cause the third device to:
receive the fourth encrypted file;
receive the private encryption key of the encryption key pair in response to detection of the future event;
decrypt the fourth encrypted file using the private encryption key associated with an occurrence of a future event to generate a sixth encrypted file; and
decrypt the sixth encrypted file using a third private encryption key associated with the third public encryption key of the second intended recipient.

8. The system according to claim 1, the first processor to further execute the first processor-executable instructions in order to cause the first device to:
encrypt the file using a third public encryption key of a second intended recipient to generate a third encrypted file; and
encrypt the third encrypted file using the second public encryption key associated with an occurrence of a future event to generate a fourth encrypted file.

9. A system comprising:
a first memory system storing first processor-executable instructions; and
a first processor to execute the first processor-executable instructions in order to cause a first device to:
receive a request for an encryption key pair including a first private encryption key and a first public encryption key, the encryption key pair associated with a future event and an intended recipient;
generate the encryption key pair;
transmit the first public encryption key to a second device;
receive, from the second device, a file encrypted using the first public encryption key and using a second public encryption key of an intended recipient;
transmit the file to a third device associated with the intended recipient;
detect the future event; and
in response to the detection of the future event, transmit the first private encryption key to the third device.

10. The system according to claim 9, wherein the encrypted file is signed using a private key of a sender associated with the second device.

11. The system according to claim 9, the first processor to execute the first processor-executable instructions in order to cause the first device to:
receive, from the second device, a second file encrypted using the first public encryption key and using a third public encryption key of a second intended recipient;
transmit the file to a fourth device associated with the second intended recipient; and
in response to the detection of the future event, transmit the first private encryption key to the fourth device.

12. A non-transitory medium storing processor-executable instructions, the instructions executable by a first device to:
receive a request for an encryption key pair including a first private encryption key and a first public encryption key, the encryption key pair associated with an occurrence of a future event that is independent of the encryption key pair and an intended recipient;
generate the encryption key pair associated with an occurrence of a future event;
transmit the first public encryption key to a second device;
receive, from the second device, a file encrypted using the first public encryption key and using a second public encryption key of an intended recipient;
transmit the file to a third device associated with the intended recipient;
detect the occurrence of the future event; and
in response to the detection of the occurrence of the future event, transmit the first private encryption key to the third device.

13. The medium according to claim 12, wherein the encrypted file is signed using a private key of a sender associated with the second device.

14. The medium according to claim 12, the instructions executable by the first device to:
receive, from the second device, a second file encrypted using the first public encryption key and using a third public encryption key of a second intended recipient;
transmit the file to a fourth device associated with the second intended recipient; and
in response to the detection of the future event, transmit the first private encryption key to the fourth device.

15. The method for a first device, comprising:
receiving a request for an encryption key pair including a first private encryption key and a first public encryption key, the encryption key pair associated with associated with an occurrence of a future event that is independent of the encryption key pair and an intended recipient;
generating the encryption key pair associated with an occurrence of a future event;
transmitting the first public encryption key to a second device;
receiving, from the second device, a file encrypted using the first public encryption key and using a second public encryption key of an intended recipient;
transmitting the file to a third device associated with the intended recipient;
detecting the occurrence of the future event; and
in response to the detection of the occurrence of the future event, transmitting the first private encryption key to the third device.

16. The method according to claim 15, wherein the encrypted file is signed using a private key of a sender associated with the second device.

17. The method according to claim 15, further comprising:
receiving, from the second device, a second file encrypted using the first public encryption key and using a third public encryption key of a second intended recipient;
transmitting the file to a fourth device associated with the second intended recipient; and
in response to the detection of the future event, transmitting the first private encryption key to the fourth device.

* * * * *